United States Patent [19]

Anderson et al.

[11] Patent Number: 5,474,794
[45] Date of Patent: Dec. 12, 1995

[54] RAPID CHILLING OF SHELL EGGS USING CRYOGENIC GASES

[75] Inventors: Kenneth E. Anderson, Garner; Patricia A. Curtis, Cary; Frank T. Jones, Raleigh, all of N.C.

[73] Assignee: North Carolina State University, Raleigh, N.C.

[21] Appl. No.: 437,510

[22] Filed: May 9, 1995

Related U.S. Application Data

[63] Continuation of Ser. No. 182,855, Jan. 18, 1994, abandoned.

[51] Int. Cl.$^6$ .................................................. L23L 1/32
[52] U.S. Cl. ...................... 426/614; 426/393; 426/524
[58] Field of Search ................................. 426/298, 300, 426/614, 393, 524

[56] References Cited

U.S. PATENT DOCUMENTS

| | | | |
|---|---|---|---|
| 51,480 | 12/1865 | Rhodes et al. | 426/298 |
| 3,082,097 | 3/1963 | Haller | 426/298 |

OTHER PUBLICATIONS

Anderson, Kenneth E. *Misset–World Poultry*, vol. 9, No. 11 (Nov., 1993).
Desrosier et al, Food Preservation. 1982. The AVI Publishing Co., Inc. Westport, Conn., pp. 65 & 66.
O. R. Fennema, Food Chemistry 1985, Marcel Dekker, Inc. New York. p. 846.
W. J. Stadelman. Egg Science and Technolgoy, 1977, The AVI Publishing Co., Inc. pp. 146, 147 & 152–154.
S. A. Kaloyereas Science Feb. 18, 1949. vol. 109. No. 2825. pp. 171–173.

*Primary Examiner*—Anthony J. Weier
*Attorney, Agent, or Firm*—Richard E. Jenkins

[57] ABSTRACT

A method for the rapid cooling of a raw egg in a shell, the shell egg being warm and having an internal temperature typically of about room temperature or higher. The method preferably involves placing the shell egg for about 1 to about 5 minutes in an atmosphere of cryogenic gas at a temperature of about –60° F. (about –51° C.) to about –120° F. (about –84° C.), whereby the internal temperature decreases sufficiently to inhibit residual pathogenic and/or spoilage microorganisms, such as Salmonella and/or Pseudomonas, respectively, present inside the shell egg. Also a cool raw shell egg in a shell that has been rapidly cooled in an atmosphere of cryogenic gas after having been warmed, typically to where the shell egg had an internal temperature typically of about room temperature or higher. The cool shell egg that has been so subjected to rapid cooling has fewer viable residual pathogenic and spoilage microorganisms, i.e., the microorganisms are substantially more inhibited, than a comparable cool shell egg that initially had about the same amount of residual pathogenic and spoilage microorganisms as the rapidly cooled shell egg prior to processing, but had not been rapidly cooled.

14 Claims, No Drawings

RAPID CHILLING OF SHELL EGGS USING CRYOGENIC GASES

This is a continuation of application Ser. No. 08/182,855 filed on Jan. 18, 1994 now abandoned.

TECHNICAL FIELD

The present invention, in general, relates to the processing of raw shell eggs as they are washed with water and candled, and then packaged and placed in cold storage for shipment to retail outlets. More specifically, the present invention relates to a method for rapid cooling of a warm raw shell egg in an atmosphere of cryogenic gas, whereby the internal egg temperature decreases rapidly to a temperature sufficiently low to substantially inhibit activity of residual pathogenic microorganisms, such as Salmonella, present inside the shell egg.

RELATED ART

As is well known, chickens carry microorganisms that are pathogenic to humans or that spoil food. Salmonella, particularly *Salmonella enteritidis*, and Pseudomonas, particularly *Pseudomonas fluorescens*, are examples of bacteria that are pathogenic microorganisms and spoilage microorganisms, respectively, which are carried by chickens. Other examples of pathogenic microorganisms that can be carried by chickens are Listeria and Yersinia.

Moreover, chickens have one orifice, called the cloaca, which is employed for both eliminating excrement and laying eggs. As a result, the eggs, during laying, are easily contaminated with fecal matter and the pathogenic and spoilage microorganisms therein. Of course, the laid eggs are further contaminated with fecal matter during the time they are in the hen house till a worker removes them for processing.

It is noted that of the various kinds of pathogenic and/or spoilage microorganism contamination, especially Salmonella contamination is a problem. Salmonella poses a great danger to humans consuming the eggs as Salmonella is a pathogen that can easily make a human so sick as to die.

Hence, during the processing of raw shell eggs, wherein they are candled and then packaged for eventual distribution to retail outlets and sale to the consumer, the eggs are washed. The typical current procedure employed by commercial egg processing plants is to spray wash the eggs with hot water containing detergent while scrubbing the eggs with rotating brushes to remove fecal matter from the outside thereof. After washing, the eggs are rinsed with fresh plain hot water to remove the detergent-containing wash water.

It is noted that in the standard procedure employed by commercial packers in the washing process, the wash water is re-used and thus the wash water itself is also a source of pathogenic and spoilage microbial contamination. Fresh detergent-containing wash water is provided only every four hours.

Nevertheless, since shells are porous, a microbial load from the pathogenic and/or spoilage microorganisms, such as Salmonella, will still be present inside the raw shell eggs, and cannot be removed by washing. As noted, the washing only removes what is on the outside. Therefore, as further discussed below, processed raw eggs are typically stored in the cold to inhibit residual microorganisms.

A general overview of the current commercial procedures for processing raw shell eggs is disclosed in Anderson, "Refrigeration and Removal of Heat from Eggs," *Misset-World Poultry*, Vol. 9, No. 11 (November, 1993). This article summarizes a study in which temperature profiles were determined for raw shell eggs during processing from when the eggs were brought to a commercial packing house in North Carolina till they were in final cold storage awaiting shipment to retail outlets. By use of an infrared video camera/recorder and probe thermometers, the temperatures of the eggs and the time the eggs were at those temperatures during various processing steps (transporting to the packing house, washing, drying, candling, packaging, and storing for eventual shipment to retail outlets) were measured.

Although not mentioned in the article, it is noted that Federal Regulations have been imposed requiring that the eggs coming into the packing house must be washed with hot water. The Federal Regulations are based on a belief that hot water will prevent microorganisms from being drawn through the porous shell into the egg and will remove fecal matter better from the in-coming eggs than cold water will.

Under the Federal Regulations, the wash water must be at a temperature of at least 90° F. (32.2° C.) plus at least 20° F. (11° C.) higher than the temperature of the in-coming raw shell egg with the highest temperature. Sometimes the incoming eggs are shipped in coolers to the egg processing plant, but sometimes the plant is in-line and the eggs are coming directly after being laid without any cold storage first. As a result, commercial egg processors usually keep the wash water at about 115° F. (about 46° C.), with some processors keeping it as high as about 125° F. (about 51.7° C.). Also, the rinse water is usually kept at these temperatures.

The purpose of the study set out in the article was to determine how well a typical commercial packing house kept the raw shell eggs cool, for it is well known that many pathogenic and spoilage microorganisms proliferate in heat. For instance, it is known that Salmonella proliferates in heat, until, of course, the heat is so great, i.e., the heat of cooking, that it kills the Salmonella. Research has shown, which research is cited in the article, that as the temperature declines, then concomitantly, Salmonella activity declines till replication ceases at about 45° F. (about 7° C.). Moreover, the research has additionally shown that Salmonella exposed to such lower temperatures during storage is more easily killed during cooking than Salmonella not so exposed.

It is noted that based on this Salmonella research, about 2 years ago, the State governments in various States that are big egg-producers, such as North Carolina, New York, and Pennsylvania, imposed regulations for post-processing coolers for raw shell eggs to be kept at about 45° F. (about 7° C.). Hence, egg processors typically keep raw shell eggs cool after packing (during storage and subsequent transport to retail outlets), and retailers typically keep raw shell eggs cool during storage for consumer purchase. Legislation for Federal Regulations vis-a-vis the United States Department of Agriculture (hereinafter U.S.D.A.) for raw shell eggs to be kept at post-processing temperatures of about 45° F. (about 7° C.) anywhere in the United States are still pending.

The article goes on to describe how after collection at the hen house, the raw shell eggs were placed in pre-processing coolers and shipped to the packing house. The eggs were then brought into the packing room from the pre-processing coolers and put on an unloader. Next, the eggs were moved onto a conveyance system (colloquially referred to as a spooler) by which they were taken into a washer and washed in hot water.

After exiting the washer, the eggs were blown dry with ambient air and then candled. Lastly, the eggs were packaged in 30-egg fibre flats stacked twelve flats inside cases, i.e., the cases each held 30 dozen eggs. The cases were stacked on a pallet holding 30 cases for a total of 900 dozen eggs per pallet. Some eggs were packaged in foamed polystyrene cartons (twelve eggs to a carton), instead of 30-egg fibre flats, which were then cased and palletized.

The pallets were placed in a final post-processing cooler. Sometimes, if the post-processing cooler was large enough, the palletizing of the cases was performed inside of the cooler. The packaged and palletized raw shell eggs, still warm from the washing, were placed in cold storage, rather than in shelf storage at room temperature, since, as noted above, not only is it known that heat encourages activity of the residual Salmonella present therein, but also North Carolina has State Regulations requiring the cool temperatures for post-processing storage.

As set out in the article, the following temperature profiles were found during the study of the commercial procedures for processing raw shell eggs. Pre-processing coolers were kept at a temperature of about 60° F. (about 15.6° C.); the wash water was kept at a temperature of about 115° F. (about 46.1° C.); the candling lights were kept at a temperature of about 90° F. (about 32.2° C.); and the post-processing coolers were kept at a temperature of about 50° F. (about 10° C.).

With regard to the temperatures of the raw shell eggs themselves, internal egg temperatures were found to be within about 2° F. (about 1.1° C.) of the surface (the outside of the shell) egg temperatures after a brief equilibration time. When the eggs were awaiting processing after being brought into the packing room from the pre-processing cooler and placed on the unloader, initial surface temperatures ranged from about 62° F. to 68° F. (about 16.7° C. to 20° C.) as processing started. Next, internal heating of the eggs began when eggs on the spooler entered the washer, and the surface temperature was about 105° F. (about 40.6° C.). As the eggs exited the washer, the surface temperature was about 109° F. (about 42.8° C.). At the point where the washed eggs were blown dry with ambient air, the surface temperature was about 95° F. (about 35° C.).

After palletizing in the processing room, due to the high surface temperatures caused by the hot wash water, the internal temperatures of the raw shell eggs continued to rise. But at five minutes after processing, the surface temperatures were down to about 76° F. to 80° F. (about 24.4° C. to 26.7° C.). These surface temperatures were still about 12° F. to 14° F. (about 6.7° C. to 7.7° C.) higher than when the eggs had been taken from the pre-processing coolers and were on the unloader awaiting processing.

Some of the palletized eggs were not placed immediately inside of the post-processing coolers. Thus, these eggs were not subjected to immediate slow cooling inside of the coolers, but rather stayed warm from sitting in the ambient packing house atmosphere for as much as six hours till the pallets were finally placed inside of the coolers. Of course, eggs palletized inside of the coolers had immediate temperature drops, but still the cooling was slow. In short, even after the eggs were inside of the coolers (whether or not palletized therein), the eggs stayed warm for many hours as the slow cooling by the coolers took a long time.

More particularly, for the raw shell eggs packaged in 30-egg fibre flats and palletized in the egg processing plant followed by the pallets being moved for storage into the post-processing coolers, eggs at the center of the pallet required about 142 to 150 hours to reach the ambient temperature of the cooler. In general, those eggs near the pallet extremities equalized to the ambient temperature of the cooler in about 72 hours. The raw shell eggs packaged in foamed polystyrene cartons fared even worse, as the foamed polystyrene cartons retarded the cooling of the palletized eggs due to the decreased air movement and the insulative effect caused by the cartons.

Thus, clearly as set out in the article, there is a problem with the current commercial processing procedures in that egg packing plants keep raw shell eggs warm for as long as six days, sometimes longer. During this time, activity of residual pathogenic and spoilage microorganisms, such as Salmonella and Pseudomonas, present in the eggs will be encouraged, increasing the danger of sickness or death therefrom to humans who consume the eggs. Hence, it is desirable to find a way to alleviate this problem.

Especially it is noted that in today's world, foamed polystyrene cartons have generally replaced paperboard cartons for the packaging of a dozen raw shell eggs to a carton since the foamed polystyrene affords greater cushioning than does paperboard and therefore decreases the incidence of cracked egg shells during transport of the eggs. As compared to foamed polystyrene, paperboard allows for more efficient transfer of heat/cold, so that in the past, the post-processing cooler more quickly cooled the palletized eggs therein. Foamed polystyrene, on the other hand, is a good thermal insulator and thus transfer of heat/cold therethrough is very inefficient.

Accordingly, even though with raw shell eggs packaged in 30-egg fibre flats and 12-egg paperboard cartons, it is desirable to find a way to cool the eggs more quickly than the post-processing cooler cools palletized eggs. In today's world, due to eggs being packaged in 12-egg foamed polystyrene cartons, finding a way for more rapid cooling is even more important as the good insulative property of foamed polystyrene further retards the ability of the post-processing cooler to cool the palletized eggs.

OBJECTS AND SUMMARY OF THE INVENTION

Thus, it is an object of the present invention to provide a method for the rapid cooling of raw shell eggs that are warm from processing/packaging procedures, such as washing, by which process residual pathogenic and/or spoilage microorganisms, such as Salmonella and Pseudomonas, respectively, present in the eggs are inhibited.

It is a further object of the present invention to provide a method for the rapid cooling of raw shell eggs that are warm, whereby the eggs maintain good quality, including, but not limited to, quality factors such as one or more of good yolks, good albumen, and absence of cracks in the shell.

It is therefore an advantage of the present invention that raw shell eggs subjected to the inventive method have fewer viable residual pathogenic and/or spoilage microorganisms, such as Salmonella and Pseudomonas, respectively, present therein, i.e., the residual microorganisms are more inhibited, and thus the eggs are safer for the consumer to eat than raw shell eggs subjected to the current commercial processing procedures. The eggs of the invention are safer when eaten raw (such as when mixed in Hollandaise sauce), as well as when eaten cooked (such as fried eggs).

Accordingly, the present invention provides a method for rapid cooling of a raw egg in a shell, the shell egg being warm in that the shell egg has an internal egg temperature too high to substantially inhibit residual pathogenic and spoilage microorganisms, such as Salmonella and Pseudomonas, present inside the shell egg. Typically, the shell egg has an internal egg temperature of about room temperature or higher. The method comprises placing the warm shell egg for a time sufficient in an atmosphere of cryogenic gas at a gas temperature sufficiently low, thereby decreasing the internal egg temperature rapidly whereby the warm shell egg is changed to a cool shell egg. The resultant cool shell egg has an internal egg temperature sufficiently low to substantially inhibit residual pathogenic and spoilage microorganisms, such as Salmonella and Pseudomonas, present inside the cool shell egg.

In a preferred embodiment, the method comprises the time being sufficient so that the internal egg temperature decreases to a temperature of about 52° F. (about 11° C.). Then, the cooling in the cryogenic gas atmosphere is stopped, so that the rapid temperature decrease is stopped, typically by the shell egg being removed from the atmosphere of cryogenic gas. After the rapid cooling is stopped, the egg on its own continues to cool. In other words, the internal egg temperature on its own continues to decrease to about 45° F. (about 7° C.) or lower. The decrease to about 45° F. (about 7° C.) or lower usually takes about 35 to 45 minutes.

Furthermore, the present invention also provides a raw egg in a shell, comprising a cool shell egg with substantially inhibited residual pathogenic and spoilage microorganisms, such as Salmonella and Pseudomonas, present therein. This cool shell egg of the present invention, has been during processing, previously warmed to where the shell egg had a previous internal egg temperature too high to substantially inhibit residual pathogenic and spoilage microorganisms present inside the shell egg, and then was rapidly cooled in an atmosphere of cryogenic gas to where the egg had a decreased internal egg temperature. Consequently, the rapidly cooled shell egg of the present invention has present therein residual pathogenic and spoilage microorganisms more inhibited than a comparable cool shell egg that initially had about the same amount of residual pathogenic and spoilage microorganisms as the rapidly cooled shell egg prior to processing, and that had been treated in a similar way but the similar way having been free of rapid cooling. In other words, the rapidly cooled shell egg has present therein fewer viable residual pathogenic and spoilage microorganisms than the comparable cool shell egg.

Some of the objects of the invention having been stated hereinabove, other objects will become evident as the description proceeds, when taken in connection with the accompanying Laboratory Examples as best described hereinbelow.

DETAILED DESCRIPTION OF THE INVENTION

With the present invention, it has been unexpectedly found that warm raw shell eggs can be subjected to a cryogenic gas at a very low temperature for a very short time to effect rapid cooling and thereby substantially inhibit residual pathogenic and spoilage microorganisms, such as Salmonella or Pseudomonas, respectively, therein. It is known that the cooler the temperature, the more the growth of many pathogenic and spoilage microorganisms is slowed down or stopped. In general, microorganisms that are psychotrophs will slow down in the cold and microorganisms that are mesophiles will stop replicating in the cold. In particular, Salmonella is slowed down, until at about 45° F. (about 7° C.), activity of Salmonella is inhibited to such an extent that it will not replicate. On the other hand, Pseudomonas, is slowed down, but not stopped, at about 45° F. (about 7° C.).

Thus, by phrases such as "to substantially inhibit residual pathogenic microorganisms", and the like, as used herein, it is intended to mean that the growth of the residual pathogenic and spoilage microorganisms, such as Salmonella and Pseudomonas, is slowed down, the replication of the residual pathogenic microorganisms is stopped, or a combination thereof. In other words, residual microorganism activity decreases, ceases, or a combination thereof. Preferably, in order to substantially inhibit residual pathogenic and spoilage microorganisms, the eggs are cooled to an internal temperature of about 45° F. (about 7° C.).

Additionally, by phrases such as "substantially inhibited pathogenic microorganisms", and the like, as used herein, when describing a raw shell egg treated with the rapid cooling method as per the present invention, it is intended to mean that residual pathogenic and spoilage microorganisms, such as Salmonella and Pseudomonas, present in a raw shell egg that has been subjected to the rapid cooling method of the present invention will be more inhibited than residual pathogenic and spoilage microorganisms present in a comparable raw shell egg that initially had about the same amount of residual pathogenic and spoilage microorganisms, such as Salmonella and Pseudomonas, as the rapidly cooled shell egg at pre-processing, and that had been treated in a similar way during processing, but had not been rapidly cooled, i.e., the similar way was free of rapid cooling. (The similar way may be the same, except that it does not include the rapid cooling as per the invention.) In other words, it is intended to mean that the rapidly cooled raw shell egg has fewer viable residual pathogenic and spoilage microorganisms than the comparable cooled raw shell egg has.

Furthermore, by terms such as "processing" of raw shell eggs, and the like, as used herein, it is intended to refer to present commercial processing that employs a Federally required hot water wash, as well as the below described variation on commercial processing that employs a cold water wash (the cold water wash would necessitate a modification of the present Federal Regulations for hot wash water temperatures).

As discussed below in more detail, the present invention relates to rapid cooling of warm raw shell eggs, that have an internal temperature too high to substantially inhibit residual pathogenic and spoilage microorganisms, such as Salmonella and Pseudomonas, by employing a cryogenic gas treatment. The invention should work to inhibit other pathogenic microorganisms that also proliferate in heat, and therefore it is not intended to limit the invention to the inhibition of Salmonella and/or Pseudomonas.

Since preferably the rapid cooling method of the invention will be applied to raw shell eggs that are warm from the packing procedure of washing in a commercial processing plant, the raw shell eggs typically will have an internal temperature at about room temperature (70°–72° F.; 21.1°–22.2° C.), or higher. Representative temperatures at a commercial processing plant, after washing/candling and prior to packaging, are that the surface temperatures of the raw shell eggs will be about 76° F. to 80° F. (about 24.4° C. to 26.7° C.) and the internal temperatures will be about 2° F. (about 1.1° C.) more, namely about 78° F. to 82° F. (about 25.6° C. to 33.3° C.).

It is also contemplated that the cryogenic gas treatment of the present invention could be effected on the raw shell eggs prior to the processing procedure of washing. This embodiment would be particularly effective for an in-line processing plant. An in-line plant is one wherein the raw shell eggs go directly from the hen house to the packing plant, as compared to an off-site plant wherein the raw shell eggs from the hen house are first put in pre-processing coolers and then shipped therein to the processing plant for packing.

In the embodiment wherein the cryogenic gas treatment of the present invention is effected on the raw shell eggs prior to washing, then a variation on current commercial processing, which employs a Federally required hot water wash, should be used. The variation is that the eggs should be washed in cold water. (The cold water wash would necessitate a modification of the present Federal Regulations for hot wash water temperatures.) The eggs should be washed in cold water for two reasons.

The first reason is that when the inventors subjected raw shell eggs with an internal temperature of about 60° F. (about 15.6° C.) to water at a temperature of about 110° F. (about 43.3° C.), a typical wash water temperature used in commercial plants, the inventors found that application of water having a temperature of about 50° F. more (110° F.–60° F.=50° F.) was too much for the shells to tolerate and they cracked.

The second reason is that the few minutes the eggs would be in the 110° F. (43.3° C.) water for washing and rinsing would re-heat the eggs and they would have to be re-cooled with the rapid cooling method to return to the desired 45° F. (7° C.) prior to packing. However, it is noted that the candling lights, which are kept at temperatures of about 90° F. (about 32.2° C.), probably would not be a factor in re-heating, as each egg is only in front of the candling light for a few seconds, a time insufficient to cause re-heating.

Additionally, it is contemplated that the cryogenic gas treatment of the present invention could be effected after the packaging of shell eggs in a carton or flat, and it should take about 10 minutes to about 60 minutes to achieve the desired temperature. In this embodiment, the cryogenic cooling chamber in which the eggs were subjected to a cryogenic gas could even be the post-processing cooler.

In the event the palletized eggs were in the post-processing cooler for a while, the cryogenic gas could still be introduced thereto in accordance with the present invention. Thus, in this situation, the inventive rapid cooling method would be applied to raw shell eggs that were somewhat cool, for instance with an internal temperature of about 55° F. to about 65° F. (about 12.8° C. to about 18.3° C.), but not yet at the desired internal temperature at which the pathogenic and spoilage microorganisms are substantially inhibited (preferably, about 45° F.; about 7° C.). However, in this situation, the inventive rapid cooling process probably would not be as effective in inhibiting residual pathogenic and spoilage microorganisms, such as Salmonella or Pseudomonas, since the eggs would have been slowly cooling to the internal temperature of about 55° F. to about 65° F. (about 12.8° C. to about 18.3° C.).

Therefore, by the phrase, "the shell egg being warm in that the shell egg has an internal egg temperature too high to substantially inhibit residual pathogenic and spoilage microorganisms present inside the shell egg", and the like, as used herein, it is intended to mean that the internal temperature of the warm raw shell eggs should preferably be at least about 55° F. (about 12.8° C.), more preferably at least about 65° F. (about 18.3° C.), and most preferably at least about 70° F. (21.1° C.), when they are rapidly cooled by being subjected to the inventive cryogenic gas treatment.

However, for the most efficient rapid cooling, with the current commercial processing procedures of washing and rinsing in hot water at about 115° F. (about 46.1° C.), preferably, the inventive cryogenic gas treatment should be effected directly on the warm shell eggs, i.e., after the washing/candling and before the placing of the shell eggs into the cartons or the flats. For instance, the warm shell eggs on a conveyor belt may be passed through a tunnel, or other suitable chamber containing the cryogenic gas, so that the gas contacts the outside shell surface.

Thus, in the preferred embodiment, the warm raw shell eggs, after washing, rinsing, drying, and candling, are to be passed while still on the conveyor belt into a cooling tunnel containing the cryogenic gas. Then, the rapidly cooled shell eggs are packaged, for instance a dozen to a foamed polystyrene carton, followed by the cartons being packed in cases and the cases being palletized in the post-processing cooler for storage.

Dwell time for the warm raw shell eggs in the cooling tunnel should be from about 1 minute to about 5 minutes, more preferably from about 1.5 minutes to about 4.5 minutes, and most preferably from about 2 minutes to about 4 minutes. The time, however, will vary depending on the particular cryogenic gas that is employed and the particular low temperature that is employed.

Suitable low temperatures for the cryogenic gas range from about –60° F. (about –51° C.) to about –120° F. (about –84° C.), more preferably from about –70° F. (about –57° C.) to about –110° F. (about –95° C.), and most preferably from about –80° F. (about –62° C.) to about –100° F. (about –73° C.). The temperature, of course, will vary depending on the particular cryogenic gas selected, as some gases can be brought to a colder temperature than others, as well as on the particular dwell time selected.

Many gases are suitable for use as cryogenic gases in the present invention. For a cryogenic gas to be suitable, all that is necessary is that warm raw shell eggs be rapidly cooled with the cryogenic gas, whether prior to washing, after washing, between the candling and packaging steps, or after the packaging step, whereby the internal egg temperature has been brought down to the desired level where activity of residual pathogenic microorganisms is substantially inhibited.

Hence, preferably, the warm raw shell eggs are rapidly cooled in the cryogenic gas atmosphere inside of a cooling tunnel at a cold temperature for a short time to effect heat transfer, whereby the internal egg temperature has been brought down to the desired level where activity of residual pathogenic and spoilage microorganisms is substantially inhibited, preferably about 45° F. (about 7° C.).

Suitable cryogenic gases include, but are not limited to, nitrogen, carbon dioxide, and combinations thereof. Furthermore, it is noted that from the tests performed as further described in the Laboratory Examples below, nitrogen appeared to cool the eggs faster than carbon dioxide, given the same operating conditions.

Furthermore, in connection with the cryogenic gas, it is noted that carbon dioxide, when at –109.3° F. (–78.5° C.), forms a snow, commonly known under the trademark DRY ICE. Thus, it is contemplated that the cryogenic gas treatment of the invention could include cooling the raw shell eggs down to a temperature somewhat above the desired 45° F. (7.2° C.), packaging the eggs in cartons, and then covering the cartoned eggs with a carbon dioxide snow in the cooling chamber to finish the cooling. As can be seen in Example III below, if the CO2 snow is placed directly on the eggs before packaging, care should be taken to create a light dusting of snow, rather than a thick cover of snow, as the solid CO2 could crack a few egg shells.

In connection with how far down the raw shell eggs should be cooled, in an alternative embodiment, it has been unexpectedly also found that it was not necessary to rapidly cool the shell eggs down to an internal egg temperature of about 45° F. (about 7° C.). Rather, it was sufficient to rapidly bring the internal temperature only down to an internal egg equilibration temperature of about 52° F. (about 11° C.).

As further described in Laboratory Example I below, it was found that after the shell eggs were rapidly brought to an internal temperature of about 52° F. (about 11° C.), a cool sink was formed. At this point, the shell eggs were removed from the cryogenic gas atmosphere. Due to the cool sink, the shell eggs continued to cool on their own and in approximately 35 to 45 minutes, the internal temperature thereof was down to about 45° F. (about 7° C.). The dwell time in the cryogenic gas atmosphere to achieve this equilibration temperature at which rapid cooling by the gas can be stopped and the eggs will continue to cool on their own is referred to herein as the "equilibrated dwell time to 45° F.".

Vis-a-vis the cool sink, it is noted that a layer of ice crystals about 1 mm thick was found on the inside of the shell, and although it is not intended to be bound by any theory, it is believed that the ice crystals caused the shell of the egg to operate as a cool sink, whereby the coldness continued to be transferred to the egg inside the shell. In the large scale of a commercial egg packaging plant where thousands of eggs are daily processed, this alternative embodiment would afford a great savings in time and money since it allows for the rapid cooling in the cryogenic gas atmosphere to be for a shorter dwell time as compared to the dwell time till the eggs, while in the cryogenic gas atmosphere, rapidly cool to an internal temperature of about 45° F. (about 7° C.).

Surprisingly, as further described in the Laboratory Examples below, the quality of the shell eggs was good when the cryogenic gas treatment was effected directly on the warm shell eggs. In other words, there was substantially no shell cracking.

The absence of shell cracking was particularly surprising, as it was previously thought that such rapid cooling by the cryogenic gas would not be tolerated well by the shell and thus would not be useful. It was expected that the rapid cooling would cause the shells to crack. It was found that temperature drops of about 40° F. (about 22.2° C.) were tolerated well by the egg shells.

Moreover, besides that the shells did not crack, the yolks appeared good and the albumen appeared good after the rapid temperature decrease. By qualitative terms that the yolks and/or the albumen were "good" as employed herein, it is intended to mean that the overwhelming majority of the eggs subjected to the inventive cryogenic treatment were of U.S.D.A. grade AA or A, the eggs had an average haugh unit score of 60, or a combination thereof.

The U.S.D.A. has a scheme of grades for designating egg quality based on the air cell depth. A depth of ⅛ inch (3.2 mm) or less is grade AA. A depth of ⅛ to 3/16 inch (3.2 to 4.8 mm) is grade A. A depth of 3/16 inch (4.8 mm) or greater is grade B. With the present invention, 62% of the eggs were found to be grade AA, whereas with the prior art current commercial packing procedures, only 55% were found to be grade AA.

The haugh unit score is an egg quality standard that was developed by Dr. Haugh and is a calculation based on albumen height in mm and albumen weight in grams. A haugh unit score of 65 or higher corresponds to U.S.D.A. grade AA. With the present invention, the eggs had an average haugh unit score of 60 after 30 days of storage in a post-processing cooler.

Certain preferred embodiments of the invention are further illustrated through reference to the Laboratory Examples below.

LABORATORY EXAMPLES

EXAMPLE I

In this Example, the dwell time of warm raw shell eggs subjected to rapid cooling in a cryogenic gas atmosphere to achieve the desired internal egg temperature of 45° F. (7° C.) for inhibition of Salmonella was studied. Also, the equilibrated dwell time to an internal egg temperature of 45° F. (7° C.) was studied.

By the phrase "equilibrated dwell time" is meant the time of rapid cooling in the cryogenic gas atmosphere for the internal egg temperature to be cool enough so that a cool sink formed, after which time the eggs were removed from the cryogenic gas atmosphere. Due to the cool sink, the removed eggs then sua sponte continued to cool to an internal egg temperature of 45° F. (7° C.). It was found that the internal egg temperature at the equilibrated dwell time was about 52° F. (about 11.1° C.) when the cool sink formed. The eggs were then removed from the cryogenic gas atmosphere, and in about 35 to 45 minutes the internal egg temperature further cooled on its own to an internal egg temperature of 45° F. (7° C.).

The following conditions apply to all of the below described laboratory tests that were performed on raw shell eggs. To simulate the heat imparted to raw shell eggs during the conventional washing, rinsing, and candling in an egg processing plant, raw shell eggs were warmed in a 100° F. (38° C.) hot water bath for 60 minutes so that they would be at an internal temperature of about 90° to 95° F. (about 32.2° to 35° C.), which is a temperature approximating that of raw shell eggs in a processing plant just after washing and candling.

After the warming, a set of 30 eggs was placed on a frame on a conveyor belt and then passed through a cooling tunnel containing the cryogenic gas. During the runs, three temperature probes were arranged, respectively, in each of three shell eggs, one probe in a middle shell egg, one probe in a side shell egg on one side of the frame, and one probe in a side shell egg on the opposite side of the frame.

For Tests 1 and 2, multi-pass runs of 1-minute dwell time each were carried out for a total of five passes. After each 1-minute pass, four shell eggs were taken from the frame and the internal temperatures thereof noted and recorded. As indicated in the Table below, dwell time to reach a desired internal temperature of 45° F. (7° C.) was compared with the equilibrated dwell time to reach an internal temperature of 52° F. (1.1° C.) for Tests 1 and 2. Of course, the "equilibrated dwell time to 45° F." was less than the dwell time to 45° F., as can be seen in the Table below.

For Tests 3 and 4, five separate runs of dwell times of 1 minute, 2 minutes, 3 minutes, 4 minutes, and 5 minutes, respectively, were carried out, each using a set of 30 shell eggs for a total of five sets of shell eggs. As noted above, three temperature probes were employed during the runs, except that four temperature probes (two for each of two side eggs, one for a middle egg, and also one for the ambient conditions) were employed in the 5-minute dwell time test. After each run, four shell eggs were removed and the internal temperatures thereof checked and recorded.

In Test 1, a carbon dioxide tunnel was employed for the cooling chamber. The operation was automatic and had all headers on. The temperature of the cryogenic gas inside the tunnel and outside the shell eggs was −60° F. (−51° C.).

For Test 2, the conditions and the cryogenic gas for the tunnel were the same as in Test 1, except that the operation was manual instead of automatic.

For Test 3, the conditions and the cryogenic gas for the tunnel were the same as in Test 1, except that only the last header was on instead of all the headers, thereby simulating a counter current configuration.

For Test 4, the conditions were the same for the tunnel as in Test 3, except that liquid nitrogen was used as the cryogenic gas instead of carbon dioxide.

It is also noted that heat transfer curves were determined, and it was found that approximately 40 BTUs/pound must be removed in order to cool the eggs from the beginning internal temperature of 95° F. (35° C.) to the desired internal temperature of 45° F. (7° C.). In connection therewith, the far right column of Table I below indicates, at the temperature where freezing started, i.e. at 31° F. (−0.5° C.), the loss in BTUs as the eggs moved into the latent frozen zone for an eventual equilibration at an internal temperature of 45° F. (7° C.).

The results are summarized in Table I below:

TABLE I

| Test # | Cryogenic Gas | Freezer Operation at −60° F. | Equilibrated Dwell to 45° F. (Minutes) | Internal Dwell to 45° F. (Minutes) | Estimated Equilibration Temp. for 45° F. Internal |
|---|---|---|---|---|---|
| 1 | CO2 | automatic | 2–2.35 | 4 | 31° F. −10 BTUs in Latent Zone |
| 2 | CO2 | manual | 1.4 | 2.75 | 31° F. −40 BTUs in Latent Zone |
| 3 | CO2 | counter current | 3–3.5 | ND* | ND |
| 4 | N2 | counter current | 2.5–3 | ND | ND |

*ND = Not Determined

Referring to Test 1 and Test 2, it can be seen that the rapid cooling in the cryogenic gas atmosphere took longer to cool eggs to 45° F. (7° C.) internally than to cool eggs to 45° F. (7° C.) equilibrated. The latter (the eggs whose internal temperature was 52° F., 11.1° C. when cooling by the gas was stopped) were found to have about a 1 mm ice layer on the inside surface of the shell (colloquially called latent zone crusting), which is believed to assist in the cool sink of the above-described alternative embodiment of rapidly cooling down to about 52° F. (about 11° C.) instead of down to 45° F. (7° C.).

Comparing Test 3 with Test 4, both of which had the same operating conditions, it appears that N2 cooled the eggs faster than did CO2.

Furthermore, it is noted that the shell eggs thus tested were of good quality, and no cracks were observed in the shells thereof. More particularly, all shell eggs subjected to the rapid cooling tests were candled to determine shell quality and no reverse thermal cracks were found in any of the shell eggs. Moreover, it was observed that rapid cooling had no effect on albumen height, haugh unit scores, or U.S.D.A. grades. Also, albumen pH was not different from comparisons (not subjected to the rapid cooling process), and was measured at 8.89 to 8.76 for small shell eggs and 9.05 to 8.4 for large shell eggs.

It is further noted that from the time determined for the cooling process to occur within the shell egg when the egg was exposed to cryogenic gases, it can be determined that the cryogenic cooling process can be utilized in egg processing plants that have machines that process 240 to 340 cases per hour, i.e., 86,400 to 122,400 eggs per hour.

EXAMPLE II

Rapid cooling of more raw shell eggs in carbon dioxide in a manner substantially similar to the tests in Example I was done, but this time some of the eggs were contaminated with *Pseudomonas fluorescens* to determine whether the rapid cooling inhibited the Pseudomonas.

The data in Table II is based on 60 dozen raw shell eggs that had been taken from a hen house and thus were not washed and not graded. The eggs were shipped in coolers to the test facility. For the beginning of the testing, the eggs were held in an incubator for four days at 95° F. (35° C.). Then, the eggs were divided into four groups, two of which were inoculated with Pseudomonas and two of which were not. These four groups are designated in Table II as IC (inoculated and rapidly cooled), IN (inoculated and not rapidly cooled), CC (controls not inoculated but rapidly cooled), and CN (controls not inoculated and not rapidly cooled).

Those eggs that were inoculated were dipped for five minutes into a dip solution that had a $10^8$ population of *Pseudomonas fluorescens* and was at 50° F. (10° C.). After inoculation, the inoculated eggs were air dried for 2.5 days, and then washed in hot water at 109.4° F. (43° C.). Next, one of the two groups of inoculated eggs and one of the two groups of not-inoculated control eggs were subjected to rapid cooling in carbon dioxide for 3 minutes at −60° F. (51.1° C.), including carbon dioxide snow. All eggs were then stored in a cooler. At various times, the same number of eggs from each of the four groups was removed and candled with a black light to check for fluorescence.

The presence of *Pseudomonas fluorescens* is summarized in Table II below:

TABLE II

| Testing Date | # Eggs Showing Fluorescence Proliferation of Pseudomonas | | | |
|---|---|---|---|---|
| | IC | IN | CC | CN |
| Start | 8 | 2 | 0 | 0 |
| 1 week | 47 | 14 | 3 | 7 |
| 2 weeks | 10 | 21 | 6 | 9 |
| 3 weeks | 0 | 2 | 2 | 3 |
| 4 weeks | 0 | 1 | 6 | 8 |
| 5 weeks | 0 | 0 | 4 | 2 |
| 6 weeks | 0 | 0 | 2 | 1 |
| 7 weeks | 0 | 0 | 1 | 1 |

IC = inoculated and rapidly cooled
IN = inoculated and not rapidly cooled
CC = controls not inoculated but rapidly cooled
CN = controls not inoculated and not rapidly cooled As can been seen in Table II above, the inoculated eggs that were subjected to rapid cooling showed a proliferation of Pseudomonas when tested for contamination one week after beginning the experiment, which should not have occurred. In particular, looking at the IC column for 1 week, it is noted that 47 of the inoculated eggs subjected to the rapid cooling were positive for fluorescence, and it is believed that the technician performing the experiment employed three inappropriate laboratory techniques that caused the proliferation.

First, the batch of eggs set aside for this experiment was supposed to be incubated overnight, but the laboratory technician incubated the eggs for four days. Second, the inoculation of the eggs was supposed to be by dipping them in Pseudomonas for about 30 seconds to one minute, but the laboratory technician dipped the eggs for five minutes. Third, after inoculation, the eggs were supposed to be air dried and immediately subjected to testing, but the laboratory technician let the air drying continue for 2.5 days. Thus, this experiment was invalid.

Moreover, it is further noted that no pre-tests on any of the batch of raw shell eggs set aside for this experiment were performed to see if the eggs were already contaminated with Pseudomonas.

Accordingly, further experiments with eggs inoculated with Pseudomonas were performed, as set out below in Example III, to show that the cryogenic gas treatment of the invention inhibited this microorganism.

EXAMPLE III

Rapid cooling of more raw shell eggs in carbon dioxide in a manner similar to the tests in Example II was performed; however, this time the three factors of inappropriate laboratory technician procedures noted above were absent from the testing.

The following procedures were replicated four times. Six cases of raw shell eggs were divided into two groups of 1080 eggs each and one group was inoculated with Pseudomonas. The inoculation was by spraying, not by immersing or by dipping, with a solution that had a $10^5$ population of *Pseudomonas fluorescens*.

Then, two cases from each group were taken for a total of four cases (1440 eggs) for four treatment groups. These four treatment groups are designated in the Tables below as I (inoculated), NI (not inoculated), CC (cryogenicly cooled), and TC (traditionally cooled, i.e., eggs were packaged and then set in a post-processing cooler instead of being cooled by the rapid cryogenic cooling process).

Next, the eggs were allowed to dry overnight and then processed under standard commercial conditions of 60° F. (15.6° C.) eggs being washed in 120° F. (48.9° C.) wash water. The eggs were then placed in a CO2 cooling unit and subjected to rapid cooling at −60° F. (−51.1° C.) for 3 minutes. (Some eggs were taken before washing and subjected to the rapid CO2 cooling.)

For the Pseudomonas testing, many of the rapidly cooled eggs were packed in cases holding 30 dozen each. The cases were then put in test boxes simulating pallet conditions, and stored in a cooler at 45° F. (7.2° C.) for 30 days. Also, some of the eggs not subjected to the rapid cryogenic cooling process were stored in the cooler for 30 days for comparison testing of Pseudomonas contamination. Furthermore, eggs at various other stages were taken for Pseudomonas testing, and not first stored for 30 days in the cooler.

Exterior contamination of the eggs by Pseudomonas was measured by using buffered peptone water. Rinse fluid from the eggs was diluted in the buffered peptone water to obtain countable plates on tryptic soy agar. Duplicate plates of tryptic soy agar were used for enumeration. The plates for were incubated at 77° F. (25° C.) for 48 hours.

Interior contamination of the eggs by Pseudomonas was determined by evaluating shell membrane contamination levels. The eggs were dipped in ethyl alcohol to sterilize the shell surface and then broken. The internal contents of the egg was discarded. Then, the air cell was swabbed with a sterile swab having a calcium alginate fiber tip. The swab was then placed in a sample tube with citrate buffer to dissolve the tip and release the *Pseudomonas fluorescens*. A micropipet was used to deliver a 0.5 ml portion of the citrate buffer to each of two tryptic soy agar plates. The plates were incubated at 77° F. (25° C.) for 48 hours.

For both the exterior and interior testing, counts of colonies of *Pseudomonas fluorescens* were reported on a per egg basis and factored into logarithmic data.

To check for cracked shells, ten flats of eggs were placed into the CO2 cooling unit. One flat of eggs was removed from the unit every 90 seconds, and candled to check for cracks. Even in the extreme instance where the eggs were exposed to −60° F. (−51.1° C.) in excess of 4 minutes, shell damage was not apparent. However, some CO2 snow did form and a few of the eggs contacted by the thick snow cracked. This problem was solved by placing a baffle between the CO2 discharge orifices and the eggs.

Also, the albumen pH from an average of six eggs from each flat was determined. Rapid cryogenic cooling had no effect on the albumen pH.

The results are summarized below in Tables III A, III B, and III C, and the following abbreviations are used therein:

TABLE III A

| | I | NI | CC | TC |
|---|---|---|---|---|
| Haugh Unit | 57.9 | 57.3 | 58.8 | 56.3 |
| Albumen pH | 9.14 | 9.17 | 9.15 | 9.15 |

I = inoculated
NI = not inoculated
CC = cryogenicly cooled
TC = traditionally cooled
ND = Not Determined

TABLE III B

| | \multicolumn{4}{c}{Log 10 colonies/ml} | |
| | I | NI | CC | TC |
|---|---|---|---|---|
| Pre-Wash | | | | |
| Exterior | 4.65 | 3.69 | 4.29 | 4.05 |
| Interior | 0.41 | −0.88 | −0.26 | −0.20 |
| Post-Wash | | | | |
| Exterior | 0.72 | 0.55 | 0.12 | 0.05 |
| Post-Wash Interior | 0.07 | 0.69 | 0.40 | 0.22 |
| Post-Storage | | | | |
| Exterior | 0.53 | −0.49 | −0.09 | 0.14 |
| Interior | −0.35 | −0.85 | −0.62 | −0.58 |
| Post-Wash/Post-Cool | | | | |
| Exterior | ND | ND | −0.38 | −0.02 |
| Interior | ND | ND | −0.76 | −0.22 |

TABLE III C

| | \multicolumn{4}{c}{PERCENTAGES} |
| | I | NI | CC | TC |
|---|---|---|---|---|
| Grade AA | 63.2 | 62.7 | 65.9 | 60.0 |
| Grade A | 21.5 | 22.1 | 18.8 | 24.8 |
| Grade B | 0.31 | 0.84 | 0.56 | 0.59 |
| Loss | 3.49 | 3.35 | 3.98 | 2.86 |
| Checked | 10.1 | 10.4 | 9.3 | 11.2 |

As can be seen from the post-wash/post-cool data at the bottom of Table III B, internal microbial counts were lower (larger negative logarithm) in inoculated eggs subjected to rapid cooling in the CO2 unit than the internal microbial counts in inoculated eggs cooled by traditional cooling. Thus, the results were excellent and it was found that the inventive rapid cooling of warm raw shell eggs in a cryogenic gas atmosphere substantially inhibited Pseudomonas present in the raw shell eggs.

EXAMPLE IV

The conditions of Example IV were essentially the same as those of Example I, except that much colder temperatures were employed to determine if rapid cooling at even lower temperatures than those employed in Example I would create cracks in the shells. Accordingly, some raw shell eggs were warmed in hot water to simulate processing conditions of an actual packing plant and then subjected to exposure for three minutes in a cryogenic gas atmosphere of −120° F. (−84° C.), followed by candling to determine shell quality. The eggs were not checked to see what internal temperature was reached, but rather were merely left for a dwell time of three minutes in the cryogenic gas atmosphere. Three minutes was chosen as being typical of the times of Example I. Still no reverse thermal cracks were found.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for rapid cooling of a raw egg in a shell, the shell egg being warm in that the shell egg has an internal egg temperature too high to substantially inhibit residual pathogenic and spoilage microorganisms present inside the shell egg, the method comprising:
    placing the warm shell egg for a time of about 1 to about 5 minutes in an atmosphere of cryogenic gas at a gas temperature of about −60° F. (about −51° C.) to about −120° F. (about −84° C.), thereby decreasing the high internal egg temperature rapidly whereby the warm shell egg changes to an unfrozen, cool shell egg having a crack-free shell and an internal egg temperature of about 45° F. (about 7° C.) to about 52° F. (about 11° C.) to rapidly inhibit ability to proliferate and to survive heat during cooking for residual pathogenic and spoilage microorganisms present inside the cool shell egg.

2. The method of claim 1, wherein the warm shell egg, prior to being placed in the atmosphere of cryogenic gas, has an internal egg temperature of at least about 55° F. (about 12.8° C.) or higher.

3. The method of claim 1, wherein the warm shell egg, prior to being placed in the atmosphere of cryogenic gas, has an internal egg temperature of at least about room temperature or higher.

4. The method of claim 1, wherein the internal egg temperature decreases to about 45° F. (about 7° C.).

5. The method of claim 1, wherein when the time is sufficient so that the internal egg temperature decreases to a temperature of about 52° F. (about 11° C.), then removing the shell egg from the atmosphere of cryogenic gas, placing the shell egg in a post-processing cooler, and allowing the shell egg on its own to continue to decrease the internal egg temperature to an internal temperature of about 45° F. (about 7° C.) by maintaining the shell egg at ambient conditions of the post-processing cooler for about 35 to 45 minutes.

6. The method of claim 1, wherein the cryogenic gas is selected from the group consisting of carbon dioxide, nitrogen, and combinations thereof.

7. The method of claim 1, wherein the pathogenic and spoilage microorganisms are selected from the group consisting of Pseudomonas, Salmonella, Listeria, Yersinia, and a combination thereof.

8. A raw rapidly cooled egg in a shell, comprising an unfrozen, cool shell egg with a crack-free shell and with substantially inhibited residual pathogenic and spoilage microorganisms present therein, which cool shell egg, has been during processing, previously warm to where the shell egg had a previous internal egg temperature too high to substantially inhibit residual pathogenic and spoilage microorganisms present inside the shell egg, and then was rapidly cooled for about 1 to about 5 minutes in an atmosphere of cryogenic gas at a gas temperature of about −60° F. (about −51° C.) to about −120° F. (about −84° C.) to where the shell egg had a decreased internal egg temperature of about 45° F. (about 7° C.) to about 52° F. (about 11° C.), and which rapidly cooled shell egg has present therein residual pathogenic and spoilage microorganisms more inhibited, so that they are less likely to proliferate and more easily killed from heat during cooking, than a comparable cool raw shell egg has present therein, that initially had about the same amount of residual pathogenic and spoilage microorganisms as the rapidly cooled shell egg prior to processing, and that had been treated in a similar way in that the comparably cool raw shell egg, during processing, has been previously warm to where the comparable shell egg had a previous internal egg temperature too high to substantially inhibit residual pathogenic and spoilage microorganisms present inside the comparable shell egg and then was cooled to where the comparable shell egg had a decreased internal egg temperature of about 45° F. (about 7° C.) to about 52° F. (about 11° C.) but the similar way having been free of rapid cooling.

9. The raw egg in a shell of claim 8, wherein the previous internal egg temperature is about 55° F. (about 12.8° C.) or higher.

10. The raw egg in a shell of claim 8, wherein the previous internal egg temperature is about room temperature or higher.

11. The raw egg in a shell of claim 8, wherein the decreased internal egg temperature is about 45° F. (about 7° C.).

12. The raw egg in a shell of claim 8, wherein the cryogenic gas is selected from the group consisting of carbon dioxide, nitrogen, and combinations thereof.

13. The raw egg in a shell of claim 8, wherein the pathogenic and spoilage microorganisms are selected from the group consisting of Pseudomonas, Salmonella, Listeria, Yersinia, and a combination thereof.

14. In a method for cooling of a raw egg in a shell including the steps of:

providing a warm shell egg that has an internal egg temperature too high to substantially inhibit ability to proliferate and to survive heat during cooking for residual pathogenic and spoilage microorganisms present inside the shell egg; and cooling the warm shell egg at a slow speed, to decrease slowly the high internal egg temperature, and thereby change the warm shell egg slowly to an unfrozen, cool shell egg having a cool internal egg temperature of about 45° F. (about 7° C.) to about 52° F. (about 11° C.), to slowly inhibit ability to proliferate and to survive heat during cooking for the residual pathogenic and spoilage microorganisms present inside the shell egg;

the improvement comprising:

increasing the cooling speed by placing the warm shell egg for a time of about 1 to about 5 minutes in an atmosphere of cryogenic gas at a gas temperature of about −60° F. (about −51° C.) to about −120° F. (about −84° C.), to decrease rapidly the high internal egg temperature, and thereby change the warm shell egg rapidly to an unfrozen, cool shell egg with a crack-free shell and having an internal egg temperature of about 45° F. (about 7° C.) to about 52° F. (about 11° C.), to rapidly inhibit ability to proliferate and to survive heat during cooking for the residual pathogenic and spoilage microorganisms present inside the cool shell egg.

* * * * *